United States Patent
Huang

(10) Patent No.: US 8,990,004 B2
(45) Date of Patent: Mar. 24, 2015

(54) NAVIGATION SYSTEM WITH QUERY MECHANISM AND METHOD OF OPERATION THEREOF

(75) Inventor: Jie Huang, Santa Clara, CA (US)

(73) Assignee: Telenav, Inc., Sunnyvale, CA (US)

( * ) Notice: Subject to any disclaimer, the term of this patent is extended or adjusted under 35 U.S.C. 154(b) by 414 days.

(21) Appl. No.: 12/337,485

(22) Filed: Dec. 17, 2008

(65) Prior Publication Data

US 2010/0153010 A1    Jun. 17, 2010

(51) Int. Cl.
*G01C 21/00* (2006.01)
*G01C 21/34* (2006.01)

(52) U.S. Cl.
CPC .................................. *G01C 21/3461* (2013.01)
USPC ....................................................... 701/400

(58) Field of Classification Search
None
See application file for complete search history.

(56) References Cited

U.S. PATENT DOCUMENTS

| | | | |
|---|---|---|---|
| 5,471,205 A * | 11/1995 | Izawa | 340/995.27 |
| 5,874,905 A * | 2/1999 | Nanba et al. | 340/995.2 |
| 5,893,898 A * | 4/1999 | Tanimoto | 701/201 |
| 6,047,280 A | 4/2000 | Ashby et al. | |
| 6,081,609 A * | 6/2000 | Narioka | 382/113 |
| 6,084,543 A * | 7/2000 | Iizuka | 342/357.31 |
| 6,172,641 B1 | 1/2001 | Millington | |
| 6,173,277 B1 | 1/2001 | Ashby et al. | |
| 6,178,380 B1 * | 1/2001 | Millington | 701/212 |
| 6,249,740 B1 * | 6/2001 | Ito et al. | 701/200 |
| 6,269,304 B1 * | 7/2001 | Kaji et al. | 701/209 |
| 6,314,365 B1 * | 11/2001 | Smith | 701/200 |
| 6,356,837 B1 * | 3/2002 | Yokota et al. | 701/208 |
| 6,356,840 B2 * | 3/2002 | Kusama | 701/211 |
| 6,510,386 B2 * | 1/2003 | Sakashita | 701/211 |
| 6,529,822 B1 * | 3/2003 | Millington et al. | 701/206 |
| 6,542,817 B2 * | 4/2003 | Miyaki | 701/209 |
| 6,560,530 B1 * | 5/2003 | Yamada et al. | 701/208 |
| 6,611,753 B1 * | 8/2003 | Millington | 701/209 |
| 6,621,452 B2 * | 9/2003 | Knockeart et al. | 342/357.31 |
| 6,763,301 B2 * | 7/2004 | McDonough | 701/208 |
| 6,810,327 B2 * | 10/2004 | Akashi | 701/209 |
| 6,842,693 B2 | 1/2005 | Nagamune | |
| 7,076,505 B2 * | 7/2006 | Campbell | 1/1 |
| 7,308,359 B1 | 12/2007 | Krull et al. | |
| 7,333,820 B2 | 2/2008 | Sheha et al. | |
| 7,353,111 B2 | 4/2008 | Takahashi et al. | |
| 7,386,393 B2 | 6/2008 | Zabel et al. | |
| 7,395,152 B2 * | 7/2008 | Watanabe et al. | 701/209 |
| 7,533,100 B2 * | 5/2009 | Kato et al. | 1/1 |
| 7,702,457 B2 | 4/2010 | Matsunaga et al. | |
| 7,711,478 B2 * | 5/2010 | Gluck | 701/208 |
| 2004/0027258 A1 * | 2/2004 | Pechatnikov et al. | 340/995.1 |

(Continued)

FOREIGN PATENT DOCUMENTS

EP   0355232 A2   12/1988
EP   0355232 A3   12/1988

OTHER PUBLICATIONS

Stefan Edelkamp et al. (2005). Geometric Travel Planning. IEEE Transactions on Inteligent Transporation Systems, 5-16.

*Primary Examiner* — Bhavesh V Amin
(74) *Attorney, Agent, or Firm* — IP Investment Law Group

(57) ABSTRACT

A method of operation of a navigation system includes: pre-processing an intersection from map data into an edge in query data; generating a route having a turn at the intersection; and sending the route for displaying at a device and for maneuvering the turn at the intersection by querying the query data for the edge of the intersection.

20 Claims, 8 Drawing Sheets

(56) References Cited

U.S. PATENT DOCUMENTS

| | | |
|---|---|---|
| 2004/0042405 A1 | 3/2004 | Nesbitt |
| 2004/0243307 A1* | 12/2004 | Geelen .................... 701/213 |
| 2005/0149262 A1* | 7/2005 | Oikubo .................... 701/211 |
| 2006/0100779 A1 | 5/2006 | Vergin |
| 2007/0055441 A1 | 3/2007 | Retterath et al. |
| 2008/0221786 A1 | 9/2008 | Otsuki |
| 2008/0249711 A1 | 10/2008 | Matsuda |
| 2010/0153010 A1* | 6/2010 | Huang .................... 701/210 |

\* cited by examiner

NAVIGATION SYSTEM WITH QUERY MECHANISM AND METHOD OF OPERATION THEREOF

TECHNICAL FIELD

The present invention relates generally to a navigation system, and more particularly to a system for a navigation system with a query mechanism.

BACKGROUND ART

Modern portable consumer and industrial electronics provide increasing levels of functionality to support modern life including location-based information services. This is especially true for client devices such as navigation systems, cellular phones, portable digital assistants, and multifunction devices.

Numerous technologies have been developed to utilize this new functionality. Some of the research and development strategies focus on new technologies. Others focus on improving the existing and mature technologies. Research and development in the existing technologies can take a many of different directions.

As users adopt mobile location based service devices, new and old usage begin to take advantage of this new device space. There are many solutions to take advantage of this new device opportunity. One existing approach is to use location information to provide navigation services, such as a global positioning service (GPS) navigation system for a mobile device. However, location reading systems can have inaccuracies that can impair a navigation system.

In response to consumer demand, navigation systems are providing ever-increasing amounts of information requiring these systems to handle more and more data. This information includes map data, business data, local weather, and local driving conditions. This information can change quickly requiring that navigation systems can update the data sources to remain current. For example, a navigation system needs to have access to current information relating to traffic accidents or changing weather conditions. The demand for more information and the need to remain current continue to challenge the providers of navigation systems.

Thus, a need remains for a navigation system to efficiently utilize available information, and to facilitate rapid modifications to the information. In view of the need to have accurate information, even incremental information having updates, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Disclosure of the Invention

The present invention provides a method of operation of a navigation system including: preprocessing an intersection from map data into an edge in query data; generating a route having a turn at the intersection; and sending the route for displaying at a device and for maneuvering the turn at the intersection by querying the query data for the edge of the intersection.

The present invention provides a navigation system including: a query data generation module for preprocessing an intersection from map data into an edge in query data; a routing module, coupled to the query data generation module, for generating a route having a turn at the intersection; and a communication unit, coupled to the routing module, for sending the route for displaying at a device and for maneuvering the turn at the intersection by querying the query data for the edge of the intersection.

Certain embodiments of the invention have other aspects in addition to or in place of those mentioned above. The aspects can become apparent to those skilled in the art from a reading of the following detailed description when taken with reference to the accompanying drawings.

BEST MODE FOR CARRYING OUT THE INVENTION

Figure 1:
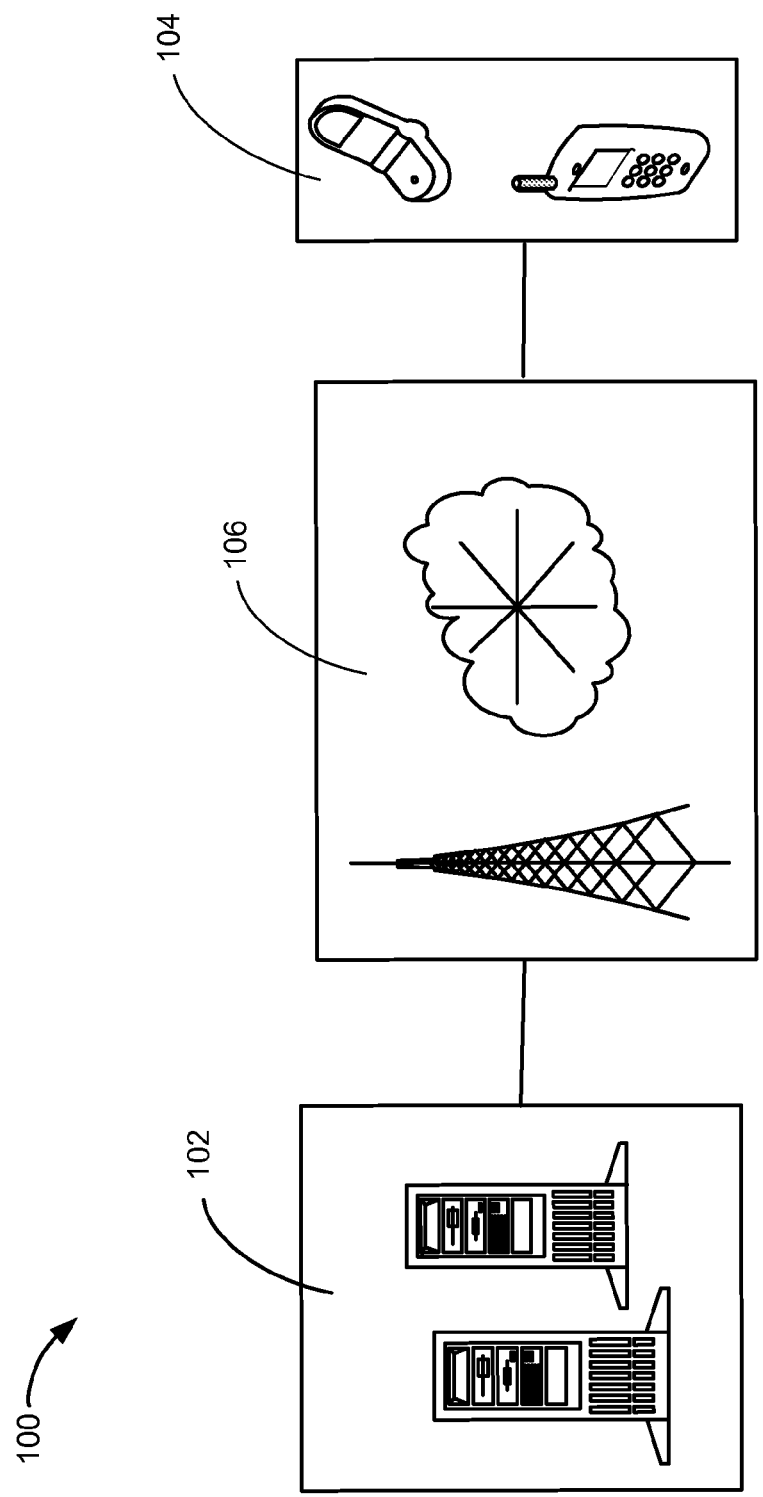
FIG. 1 is an example of an environment using an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process locations are not disclosed in detail.

Likewise, the drawings showing embodiments of the system are semi-diagrammatic and not to scale and, particularly, some of the dimensions are for the clarity of presentation and are shown greatly exaggerated in the drawing FIGs.

One skilled in the art would appreciate that the format with which navigation information is expressed is not critical to some embodiments of the invention. For example, in some embodiments, navigation information is presented in the format of (x, y), where x and y are two ordinates that define the geographic location, i.e., a position of a user.

The navigation information is presented by longitude and latitude related information. The navigation information also includes a velocity element comprising a speed component and a direction component.

The term "navigation routing information" referred to herein is defined as the routing information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, or a combination thereof.

Referring now to FIG. 1, therein is an example of an environment 100 using an embodiment of the present invention. The environment 100 applies to any embodiment of the present invention described later. The environment includes a first device 102, such as a server or client. The first device 102 can be linked to a second device 104, such as a client or server, with a communication path 106, such as a network.

The first device 102 can be any of a variety of centralized or decentralized computing devices. For example, the first device 102 can be a computer, a computer in a grid computing pool, a virtualized computer, a computer in a cloud computing pool, or a computer in a distributed computing topology. The first device 102 can include routing functions or switching functions for coupling with the communication path 106 to communicate with the second device 104.

The second device 104 can be of any of a variety of mobile devices. For example, the second device 104 can be a cellular phone, personal digital assistant, a notebook computer, or other multi-functional mobile communication or entertainment devices having means for coupling to the communication path 106.

The communication path 106 can be a variety of networks. For example, the communication path 106 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include personal area network (PAN), local area network (LAN), metropolitan area network (MAN), and wide area network (WAN).

For illustrative purposes, the first device 102 is shown in a single location, although it is understood that the server can be centralized or decentralized and located at different locations. For example, the first device 102 can represent real or virtual servers in a single computer room, distributed across different rooms, distributed across different geographical locations, embedded within a telecommunications network, virtualized servers within one or more other computer systems including grid or cloud type computing resources, or in a high powered client device.

Further for illustrative purposes, the environment 100 is shown with the second device 104 as a mobile computing device, although it is understood that the second device 104 can be different types of computing devices. For example, the second device 104 can be a mobile computing device, such as notebook computer, another client device, or a different type of client device.

Yet further for illustrative purposes, the environment 100 is shown with the first device 102 and the second device 104 as end points of the communication path 106, although it is understood that the environment 100 can have a different partition between the first device 102, the second device 104, and the communication path 106. For example, the first device 102, the second device 104, or a combination thereof can also function as part of the communication path 106.

Figure 2:
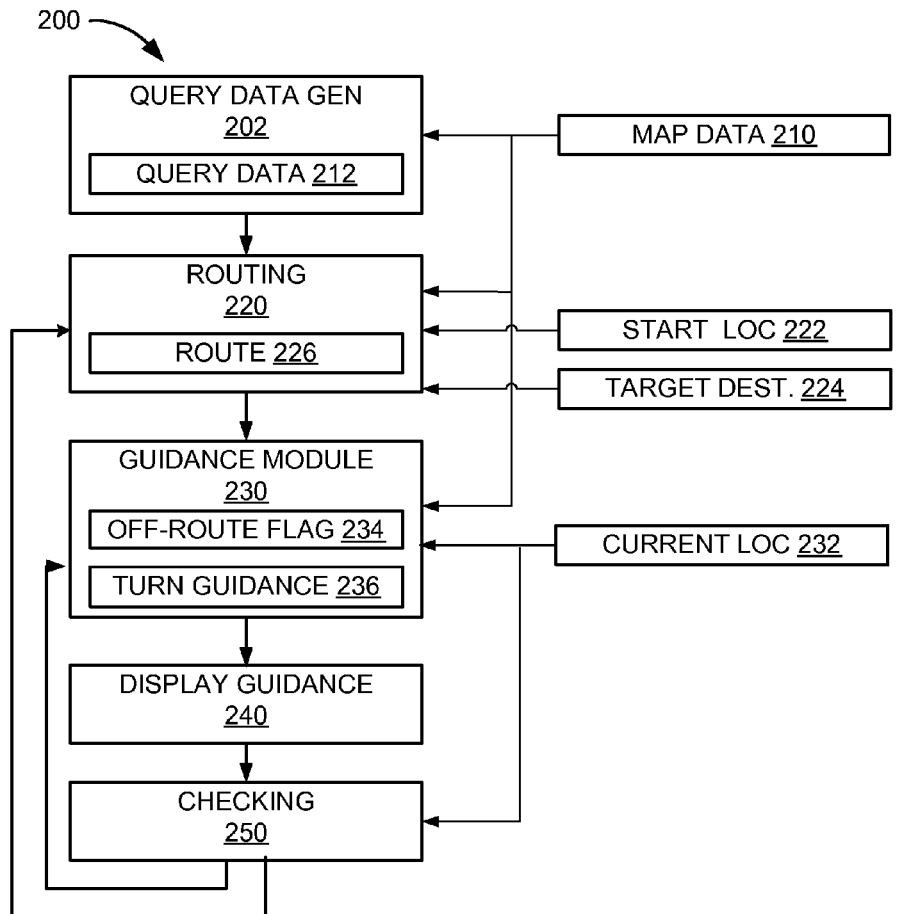
FIG. 2 is a flow chart of a navigation system in a first embodiment of the present invention.

Referring now to FIG. 2, therein is shown a flow chart of a navigation system 200 in a first embodiment of the present invention. The navigation system 200 can select a route 226 from a starting location 222 to a target destination 224. The navigation system 200 can verify whether a location reading, such as a current location 232, is on the route 226 and can generate a turn guidance 236 associated with the current location 232 and the route 226. The navigation system 200 can also generate query data 212 for use in selecting the route 226.

A query data generation module 202 can receive map data 210 and generate the query data 212. The query data 212 can be stored and can be retrieved for use by the navigation system 200. As will be described in more detail, the query data generation module 202 can pre-process the map data 210 to generate the query data 212 which can include intersection information for use by the navigation system 200 to select the route 226 and other navigation routing information.

The map data 210 can be received from another device, such as the first device 102 of FIG. 1. For example, the map data 210 can be updated or enhanced on a predetermined schedule, for example, every three months. The navigation system 200 can store and use the map data 210. The predetermined schedule can include modifications to the map data 210 since the previous scheduled update, but cannot include real-time changes. For example, weather conditions, road conditions, traffic conditions can all change on a more frequent basis than the updates to the map data 210.

A routing module 220 can receive the query data 212 from the query data generation module 202. The routing module 220 can also receive the map data 210, the starting location 222, and the target destination 224. As will be described later in more detail, the routing module 220 can select the route 226 from the starting location 222 to the target destination 224 using information included with the map data 210 and the query data 212.

A guidance module 230 can receive the route 226 from the routing module 220. The guidance module 230 can also receive the current location 232. The guidance module 230 can generate the turn guidance 236 associated with the current location 232, the route 226, or a combination thereof. The guidance module 230 can also verify whether the current location 232 is on the route 226 and can generate an off-route flag 234 if the current location 232 is off the route 226.

A display guidance module 240 can receive the turn guidance 236 from the guidance module 230, and display the turn guidance 236 on a user interface. The display guidance module 240 can also receive the off-route flag 234 from the guidance module 230, and display information associated with the off-route flag 234.

A checking module 250 can receive the route 226 generated in the routing module 220 and the current location 232.

The checking module 250 can also receive the off-route flag 234 generated in the guidance module 230. The checking module 250 can determine whether to return to the routing module 220 or the guidance module 230 of the navigation system 200, as described below.

The guidance module 230 can receive the route 226 from the routing module 220. The route 226 can include a series of road segments and turn instructions for navigating from the starting location 222 to the target destination 224. For example, a road segment can be a section of a navigable thoroughfare connecting two points, such as two intersections. The route 226 can also include the distance along a road segment. The route 226 can also include turn instructions for intersections along the route 226.

The guidance module 230 can also receive the current location 232. The current location 232 can be generated by another module of the navigation system 200 or received from another device. The guidance module 230 can compare the current location 232 with the route 226 to determine whether the current location 232 is consistent with traversal of the route 226.

For example, the guidance module 230 can determine whether the navigation system 200 is no longer traversing the route 226, or is moving in a direction which is inconsistent with traversal of the route 226, or has stopped, or a combination thereof. If the guidance module 230 determines that the current location 232 is not consistent with traversal of the route 226, then the guidance module 230 can generate the off-route flag 234.

If the guidance module 230 determines that the current location 232 is consistent with the route 226, the guidance module 230 can generate the turn guidance 236 associated with the current location 232 for continuing traversal of the route 226. The turn guidance 236 can include a turn instruction consistent with the route 226. For example, the turn guidance 236 can include an instruction to make a turn in a specified direction at an identified intersection which can be at a calculated distance from the current location 232.

As the navigation system 200 traverses the route 226, the current location 232 can be revised or updated and received by the guidance module 230. For each valid reading of the current location 232, the guidance module 230 can generate the turn guidance 236 including instructions to continue on the route 226. A valid reading includes the current location 232 consistent with the traversal and along the route 226.

The display guidance module 240 can receive the turn guidance 236 from the guidance module 230 and can display information on a user interface of the navigation system 200. The display can include a pictorial representation, audible instructions or other representations, or a combination thereof. The display guidance module 240 displays specific information concerning the next maneuver for the navigation system 200 to remain consistent with the route 226.

From the display guidance module 240, the checking module 250 can receive the route 226 generated from the routing module 220 and the current location 232. The checking module 250 can also receive the off-route flag 234 generated by the guidance module 230. If the off-route flag 234 is set, the checking module 250 can return to the routing module 220. As an example, the guidance module 230 can transition to the checking module 250 without traversing through the display guidance module 240.

From the checking module 250, the routing module 220 can use the current location 232 as a revised location for the starting location 222 to reach the target destination 224. The routing module 220 can use the starting location 222 to select new routing information for the route 226 which can correct for the current location 232 which is inconsistent with the route 226 that was selected previously.

The checking module 250 can also identify whether the navigation system 200 has arrived at the target destination 224. The checking module 250 can compare the current location 232 with the target destination 224. If the current location 232 matches the target destination 224, the checking module 250 can determine that the navigation system 200 has arrived at the target destination 224 and return to the routing module 220 for a new request for the starting location 222 and the target destination 224.

If the current location 232 does not match the target destination 224, the checking module 250 can determine that the navigation system 200 has not arrived at the target destination 224. The checking module 250 can return to the guidance module 230 for a new location reading for the current location 232 to generate new or update version of the turn guidance 236.

Figure 3:
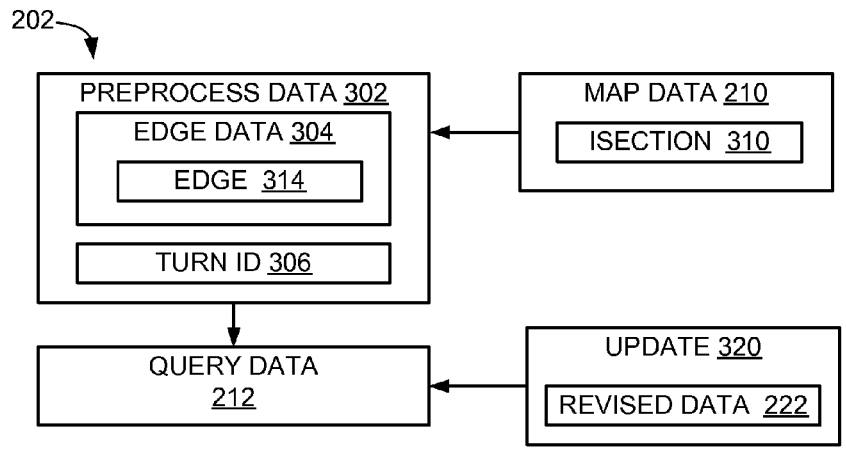
FIG. 3 is a flow chart of the query generation module of FIG. 2.

Referring now to FIG. 3, therein is shown a flow chart for the query data generation module 202 of FIG. 2. The query data generation module 202 can receive the map data 210, and can generate the query data 212 for use in selecting the route 226 of FIG. 2 between the starting location 222 of FIG. 2 and the target destination 224 of FIG. 2.

A preprocess data module 302 can receive and pre-process the map data 210 to generate the query data 212. Preprocessing is defined as partitioning intersection information to an edge, selecting a unique identification associated with the intersection, and storing the identification and the edge in the query data 212.

The preprocess data module 302 can receive the map data 210. The preprocess data module 302 can extract an intersection 310 from the map data 210. For example, the preprocess data module 302 can extract a description of the intersection 310, and generate edge data 304 which can include an edge 314 of the intersection.

The preprocess data module 302 can also extract a unique identification associated with the intersection in a turn identification 306. The edge data 304 and the turn identification 306 can be stored in the query data 212. The navigation system 200 can retrieve information for an intersection by using the turn identification 306 to retrieve the edge data 304 for the intersection.

An update module 320 can make real-time changes to the query data 212. The query data 212 can be enhanced, revised, updated, or a combination thereof with revised data 322 from the update module 320. For example, an intersection can have the edge 314 of the edge data 304 temporarily blocked by roadwork. The revised data 322 can include the edge data 304 and the turn identification 306 to describe the edge 314, which is blocked, for the intersection 310 by updating the edge data 304 associated with the intersection 310.

The update module 320 can operate independent of the scheduled revision of the map data 210 so the query data 212 can reflect current conditions in real-time. For example, the update module 320 can manually or automatically update the revised data 322, the query data 212, or a combination thereof. Sources for the revised data 322 can be from same or similar feeds providing the map data 210, from user generated content, or a combination thereof.

The turn identification 306 and the edge data 304 with the edge 314 can be edited in the query data 212. For example, the query data 212 can be loaded with a new file from another medium, such as a portable memory device, flash drive, compact disc read only medium (CD-ROM), or a combination thereof.

Figure 4:
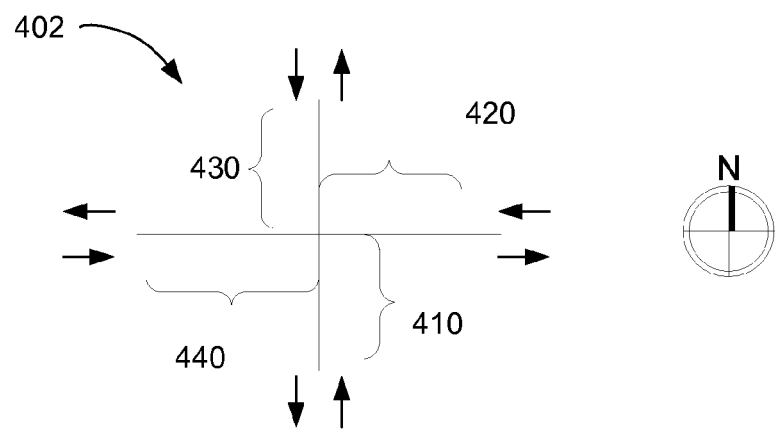
FIG. 4 is an illustration of an intersection in the query data of FIG. 3.

Referring now to FIG. 4, therein is shown an illustration of a first intersection 402 in the query data 212 of FIG. 2. The first intersection 402 can be represented by the edge data 304 of FIG. 3 with edge information such as the edge 314 of FIG. 3. For example, the first intersection 402 is a convergence of bidirectional roads. The first intersection 402 can be described as a thoroughfare on which traffic can travel in either direction.

The edge data 304 can represent the first intersection 402 with edges such as the edge 314. The edge data 304 can include a first edge 410, a second edge 430, a third edge 420, and a fourth edge 440. For example, traffic can travel along the first edge 410 and the second edge 430 in a North-South or a South-North direction. Traffic can travel on the third edge 420 and the fourth edge 440 in an East-West or a West-East direction. Bidirectional roads can be used to represent local roads, city streets, roads without a center divider or other.

For illustrative purposes, the first intersection 402 shows the bidirectional roads as being straight and intersecting at a right-angle, although it is understood that the first intersection 402 can have a different configuration. For example, the first intersection 402 can include a curved portion, portions at a different angle, or combination thereof.

Also, for illustrative purposes, the first edge 410, the second edge 430, the third edge 420, and the fourth edge 440 are shown converging at the first intersection 402, although it is understood that the first intersection 402 can have different number of converging edges. For example, the first intersection 402 can be a convergence of three edges or five edges.

The routing module 220 of FIG. 2 can read the edge data 304 and the turn identification 306 for the first intersection 402 to select the route 226 of FIG. 2. The routing module 220 can select from four different maneuvers at the intersection to include in the route 226.

For example, for the route 226 approaching the intersection along the first edge 410 and if the route 226 includes a right turn, the route 226 can include the first edge 410 and the third edge 420. If the route 226 includes continuing straight through the first intersection 402, the route 226 can include the first edge 410 and the second edge 430.

If the route 226 includes a left turn from the first edge 410, the route 226 can include the first edge 410 and the fourth edge 440. If the route 226 includes a u-turn from the first edge 410, the route 226 can include the first edge 410 northbound and the first edge 410 southbound.

Other intersections can have a different number of maneuvers available for selection. For example, an intersection with three converging bidirectional road segments can have three maneuvers available for selection.

As the routing module 220 selects the route 226 from the starting location 222 to the target destination 224, the routing module 220 can consider the edge segments to be traversed and the direction to be taken at each intersection on the route 226.

Figure 5:
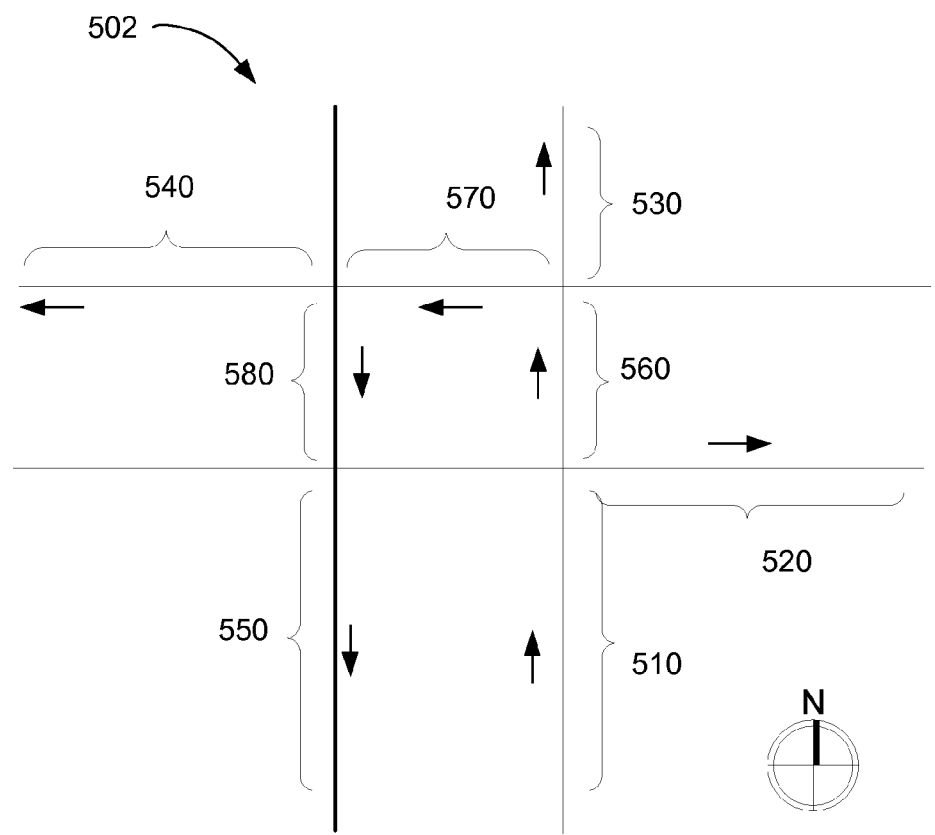
FIG. 5 is an illustration of another intersection in the query data of FIG. 3.

Referring now to FIG. 5, therein is shown an illustration of a second intersection 502 in the query data 212 of FIG. 2. The edge data 304 of FIG. 3 can represent the second intersection 502. The second intersection 502 can represent a convergence of unidirectional roads. The second intersection 502 can also represent the edge data 304 for each direction of the first intersection 402 of FIG. 4.

The edge data 304 can represent the first intersection 402 with edge segments. The edge data 304 can include a first edge 510, a second edge 520, a third edge 560, a fourth edge 530, a fifth edge 570, a sixth edge 540, a seventh edge 580, and a eighth edge 550. For example, traffic can travel along the first edge 510 in a northbound direction. Traffic can travel along the second edge 520 in an eastbound direction.

A unidirectional road can be used to describe an interstate, a highway, a road with a center divider or other. For traffic flowing in both directions, a road can be described with two unidirectional roads.

For illustrative purposes, the second intersection 502 shows the unidirectional roads as linear and intersecting at a right-angle, although it is understood that the second intersection 502 can have a different configuration. For example, the second intersection 502 can have curved portions or portions at different angles.

Also, for illustrative purposes, the second intersection 502 describes two major roads described with unidirectional roads, although it is understood that the second intersection 502 can have a different number of converging road segments. For example, the second intersection 502 can be a convergence of three road segments or five road segments. The second intersection 502 can also have restrictions on maneuvers. For example, turns such as a u-turn or a left turn may be restricted.

The routing module 220 of FIG. 2 can read the edge data 304 and the turn identification 306 of the second intersection 502 to select the route 226 of FIG. 2. The routing module 220 can select any of four different maneuvers at the second intersection 502 to include in the route 226.

For example, the route 226 can approach the second intersection 502 along the first edge 510 and if the route 226 includes a right turn from the first edge 510, the route 226 can include the first edge 510 and the second edge 520. If the route 226 from the first edge 510 includes continuing straight through the second intersection 502, the route 226 can include the first edge 510, the third edge 560, and the fourth edge 530.

If the route 226 from the first edge 510 includes a left turn, the route 226 can include the first edge 510, the third edge 560, the fifth edge 570 and the sixth edge 540. If the route 226 from the first edge 510 includes a u-turn, the route 226 can include the first edge 510, the third edge 560, the fifth edge 570, the seventh edge 580, and the eighth edge 550.

Other intersections can have a different number of maneuvers available for selection. For example, an intersection with three converging unidirectional road segments can have three maneuvers available for selection.

As the routing module 220 selects the route 226 from the starting location 222 to the target destination 224, the routing module 220 can consider the edge segments to be traversed and the direction to be taken at each intersection on the route 226.

Figure 6:
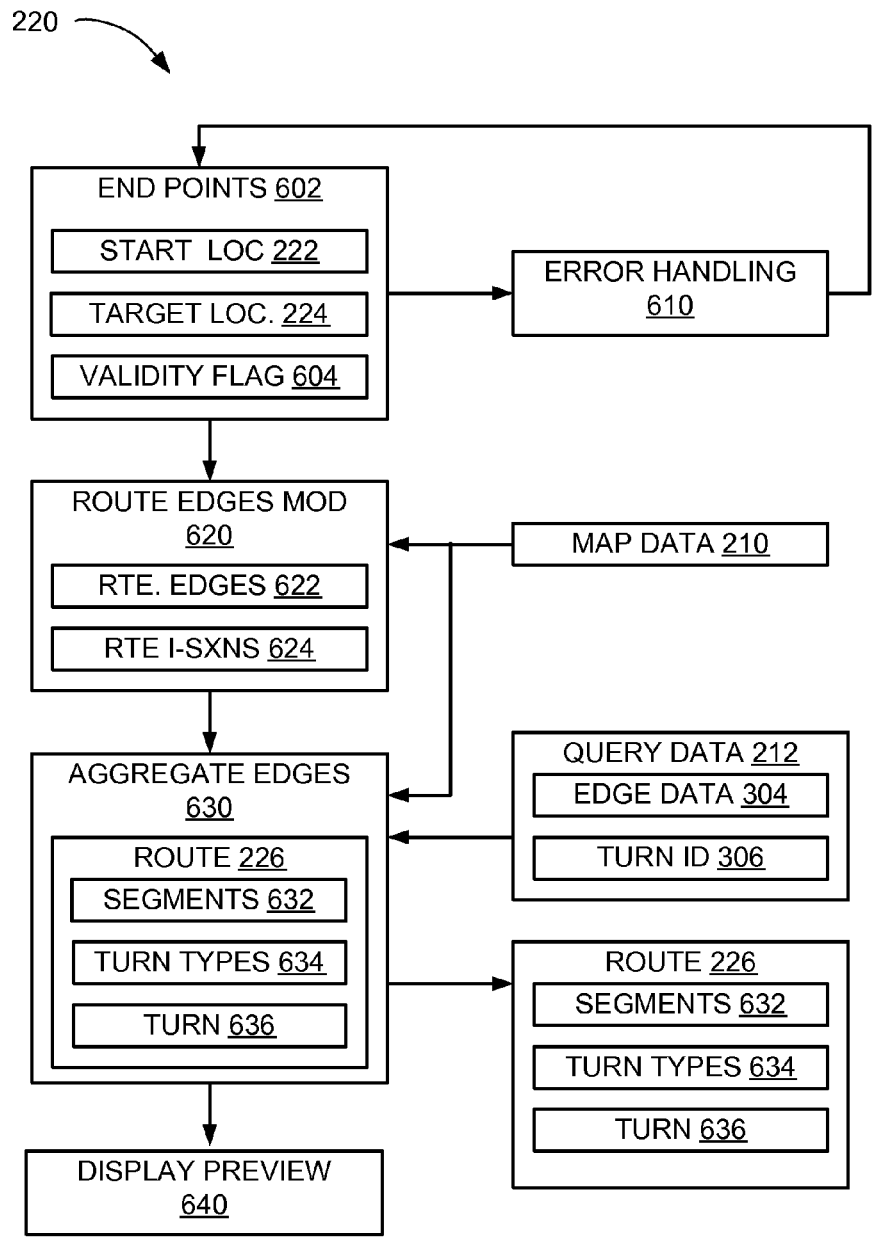
FIG. 6 is a flow chart for the routing module of FIG. 2.

Referring now to FIG. 6, therein is shown a flow chart for the routing module 220 of FIG. 2. The routing module 220 can receive the query data 212 of FIG. 2 which is preprocessed in the query data generation module 202 of FIG. 2 from the map data 210 of FIG. 2. The routing module 220 can validate the starting location 222 and the target destination 224 and can select the route 226 from the starting location 222 to the target destination 224.

An end points module 602 can receive or generate the starting location 222 and the target destination 224. The end points module 602 can generate a validity flag 604 if either the starting location 222 or the target destination 224 is determined to be invalid. The end points module 602 can determine the starting location 222 or the target destination 224 as invalid by not being in the map data 210, the query data 212 of FIG. 3, or a combination thereof.

An error handling module 610 can receive the validity flag 604, and return to the end points module 602. The error handling module 610 is described more below.

A route edges module 620 can receive the starting location 222 and the target destination 224 from the end points module 602. The route edges module 620 can use the map data 210 to generate route edges 622 and route intersections 624, such as the first intersection 402 of FIG. 4 and the second intersection 502 of FIG. 5, for the route 226 from the starting location 222 to the target destination 224. The route edges 622 can include road segments between intersections along the route 226, and the route intersections 624 can include identification for the intersections traversed along the route 226.

An aggregate edges module 630 can receive the route edges 622 and the route intersections 624 from the route edges module 620. The aggregate edges module 630 can use the query data 212 to generate segments 632, turn types 634, and turns 636 for the route edges 622 and the route intersections 624. The turns 636, the turn types 634 and the segments 632 can be included in the route 226. The aggregate edges module 630 can also receive the map data 210.

A display preview module 640 can receive the route 226 from the aggregate edges module 630. The display preview module 640 can generate a display on a user interface of a device with the navigation system 200.

The end points module 602 can receive or generate the starting location 222 and the target destination 224 in a navigation request. For example, the starting location 222 can be an address, an intersection, or a point of interest (POI). The point of interest can be an airport, a business, or a park. The target destination 224 can also be an address, an intersection, or a POI.

The end points module 602 can also validate the starting location 222 and the target destination 224. For example, the starting location 222 or the target destination 224 can be a location which is not a recognized address location or a POI which does not exist. The end points module 602 can set the validity flag 604 as invalid if it determines that either the starting location 222 or the target destination 224 is invalid.

The error handling module 610 can receive the validity flag 604 from the end points module 602. The error handling module 610 can include a predetermined response to the validity flag 604 having an invalid value. For example, the error handling module 610 can generate a warning that the route 226 cannot be generated. The error handling module 610 can proceed to the end points module 602 for inputs for the starting location 222, the target destination 224, or a combination thereof. As another example, the error handling module 610 can recommend a different course of action such as rebooting the navigation system 200.

If the starting location 222 and the target destination 224 are determined to be valid, the validity flag 604 includes a valid value. The route edges module 620 can receive the starting location 222 and the target destination 224 which have been validated.

Using the map data 210, the route edges module 620 can generate the route edges 622 to be traversed from the starting location 222 to the target destination 224. The route edges module 620 can also generate the route intersections 624. The route intersections 624 can include identification of the intersections along the route 226. The route intersections 624 can include intersections which require a maneuver such as a turn or continuing straight.

The aggregate edges module 630 can receive the route edges 622 and the route intersections 624 from the route edges module 620, and can read the query data 212 of FIG. 3. The aggregate edges module 630 can generate the route 226 with the segments 632 and the turn types 634 by removing unnecessary intersections from the route 226 and aggregating the route edges 622 into the segments 632.

The intersection 310 can be unnecessary if the route 226 traverses the intersection 310 without making a turn. For example, if the route 226 includes the first edge 410 of FIG. 4 and the second edge 430 of FIG. 4, the aggregate edges module 630 can remove the first intersection 402 of FIG. 4 from the route 226.

The aggregate edges module 630 can also aggregate the first edge 410 and the second edge 430 into one segment. Aggregating the route edges 622 and removing the unnecessary intersections from the route 226 can reduce the amount of information needed to represent the route 226 without impacting the integrity of the route 226.

The aggregate edges module 630 can also generate the turns 636 of the turn types 634 for the route intersections 624 of the route 226. The aggregate edges module 630 can query the query data 212 for the turn identification 306 which matches the route intersections 624. The aggregate edges module 630 can read the edge data 304 associated with the turn identification 306 and the route intersections 624.

The aggregate edges module 630 can use the edge data 304 to identify the route edges 622 to be traversed through the intersections, and generate the specific turn in the turn types 634 for the route intersections 624 on the route 226. The turn types 634 for traversal through intersections can be generated decoupled from processing the intersection in the query data generation module 202 of FIG. 3.

Decoupled is defined as generating information from a data file which includes data which has already been generated. For example, the query data 212 includes the intersection information, which has already been generated, including the edge data 304 for the intersection 310 with the turn identification 306 for the intersections. The routing module 220 can retrieve information from the query data 212 without needing to generate intersection information from the map data 210

The aggregate edges module 630 can generate the turn types 634 for the route 226 decoupled from processing the intersection information. The aggregate edges module 630 can also generate the turn types 634 coupled with processing the intersection information.

For example, the aggregate edges module 630 can use the map data 210 to extract intersection information and generate turn type information. For example, if the edge data 304 and the turn identification 306 of the query data 212 cannot generate guidance for a turn, the aggregate edges module 630 can generate the turn types 634 from the map data 210. Such a sequence represents processing the intersection in real-time.

It has been discovered that the present invention provides a navigation system with improve performance for providing navigation route. The navigation system can provide turn instructions for turns found in the navigation route by using a query system to a preprocessed query data. The preprocessed data reduces the amount of calculations required to provide accurate turn information with less time. Obtaining a turn type from the query data can be five times quicker than processing the turn types directly using the map data.

The display preview module 640 can receive the route 226 with the segments 632 and the turn types 634 from the aggregate edges module 630. The display preview module 640 can operate a display with the navigation system 200 to present routing information. For example, on a device with a visual display component, the display preview module 640 can select and present information included in the route 226 on the display component, including a list of the segments 632 and the turn types 634 to be traversed along the route 226. The display preview module 640 gives a preview of the route 226 from the starting location 222 to the target destination 224.

Figure 7:
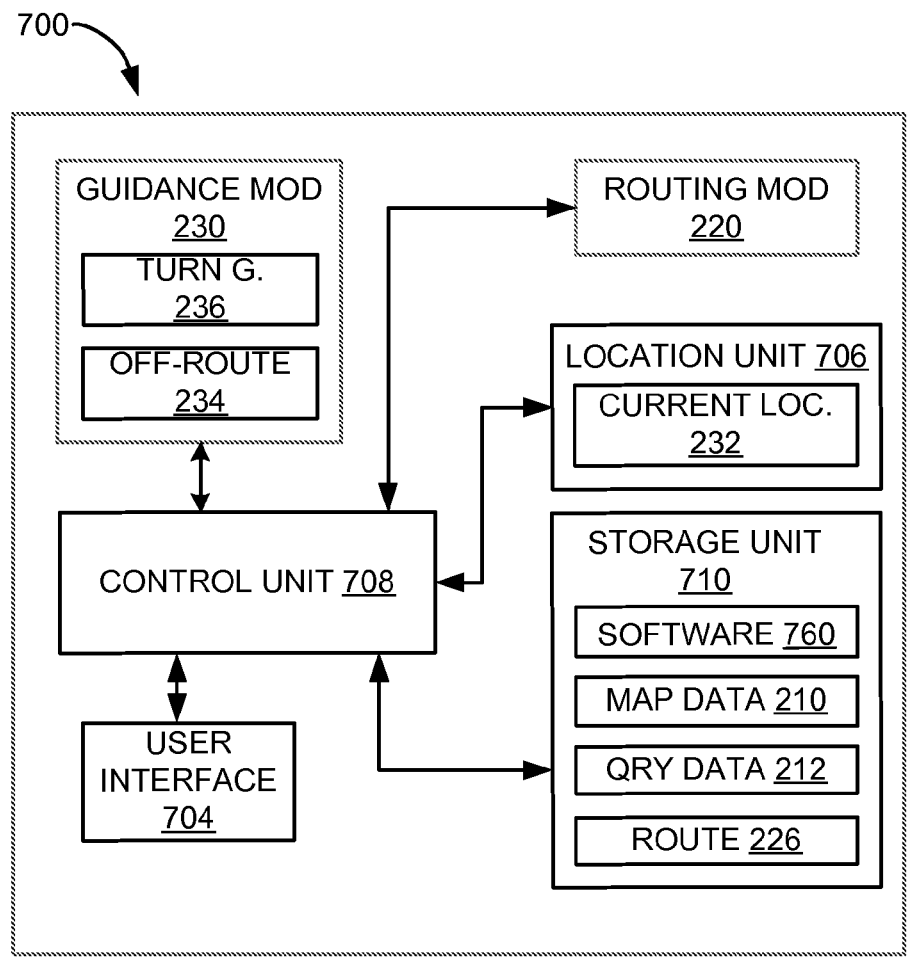
FIG. 7 is a block diagram of a navigation system in a second embodiment of the present invention.

Referring now to FIG. 7, therein is shown a block diagram of a navigation system 700 in a second embodiment of the present invention. The navigation system 700 can represent the first device 102 of FIG. 1 or the second device 104 of FIG. 1.

The navigation system 700 can be a cellular phone, personal digital assistant, a notebook computer, or other multi-functional mobile communication or entertainment device. The navigation system 700 can be a standalone device, or can be incorporated with a vehicle, for example a car, truck, bus, train, or other.

The navigation system 700 can include a user interface 704, a storage unit 710, a location unit 706, a control unit 708, such as a processor, and a software 760 in the storage unit 710. The software 760 can include the navigation system 200 of FIG. 2.

The user interface 704 can include an output device and an input device. For example, the output device can include a projector, a video screen, a speaker, an in-dash display on the vehicle or any combination thereof. Examples of the input device are a key pad, a touchpad, soft-keys, a keyboard, a microphone, or any combination thereof to provide data and command inputs. The input device can receive information into the navigation system 700 such as the revised data 322 of FIG. 3, the starting location 222 of FIG. 2, the target destination 224 of FIG. 2, or a combination thereof.

The control unit 708 can execute the software 760 and provide the intelligence of the navigation system 700. The control unit 708 can operate the user interface 704 to display information. The control unit 708 can also execute the software 760 for the other functions of the navigation system 700, including receiving location information from the location unit 706.

The control unit 708 can also operate the routing module 220 of FIG. 2 to generate the route 226. The control unit 708 can also operate the guidance module 230 of FIG. 2 to generate the turn guidance 236 associated with the current location 232 of the navigation system 700.

The location unit 706 can read location information, such as the current location 232, associated with the navigation system 700. The location unit 706 can be implemented in many ways. For example, the location unit 706 can be a global positioning system (GPS), inertial navigation system, cell-tower location system, accelerometer location system, or any combination thereof.

The storage unit 710 can be implemented in a number of ways. For example, the storage unit 710 can be a volatile memory, a nonvolatile memory, an internal memory, an external memory, or a combination thereof.

The storage unit 710 can store the software 760, setup data, and other data for the operation of the navigation system 700 with the navigation system 200. The storage unit 710 can also store the relevant information, such as maps, advertisements, point of interest (POI), navigation routing entries, or any combination thereof. For example, the storage unit 710 can include the map data 210 of FIG. 2, and the query data 212 of FIG. 3 preprocessed from the map data 210. The storage unit 710 can also include the route 226 generated by the routing module 220. The control unit 708 can operate on the data of the storage unit 710 to execute the functions of the navigation system 200.

Figure 8:
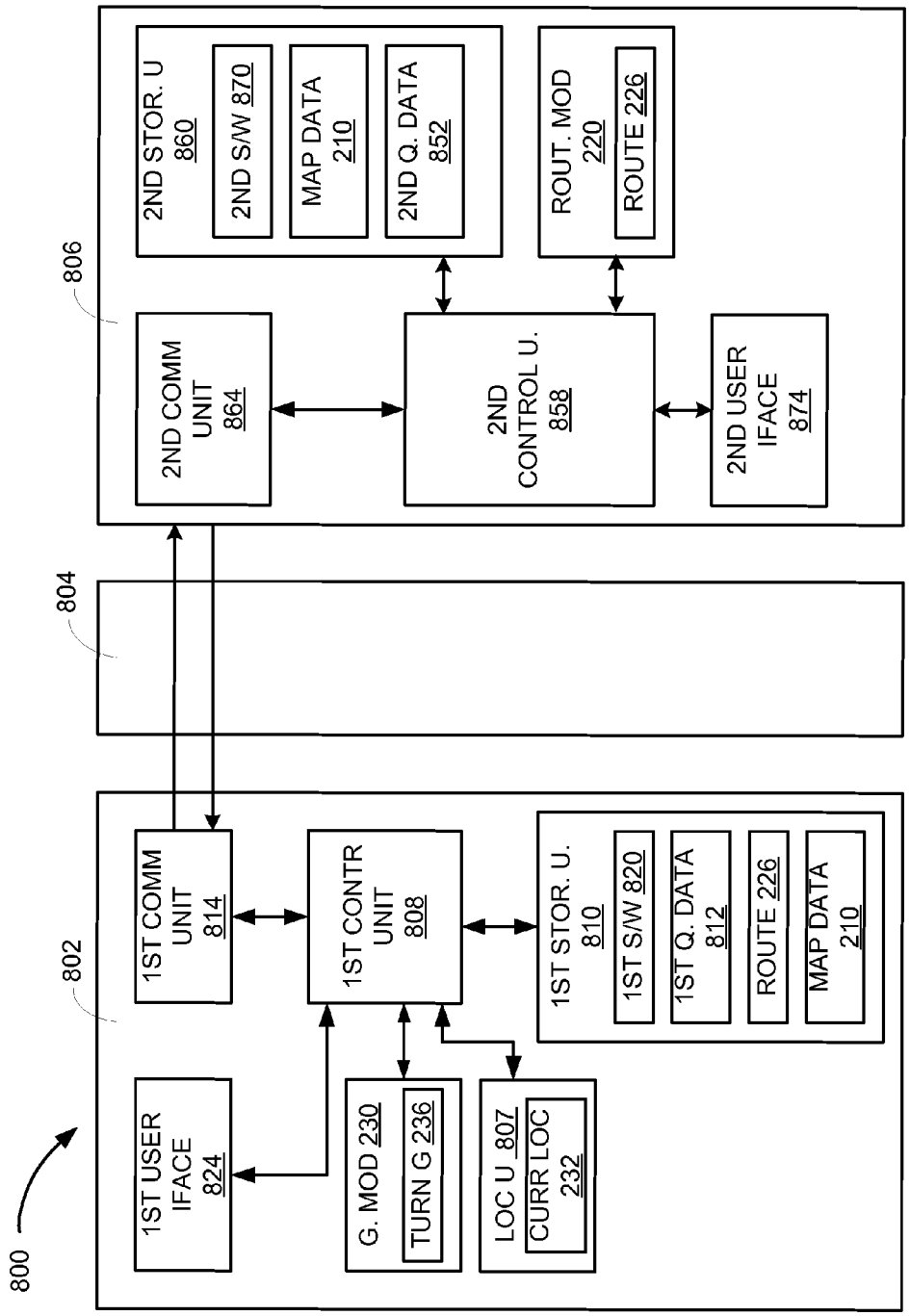
FIG. 8 is a block diagram of a navigation system in a third embodiment of the present invention.

Referring now to FIG. 8, therein is shown a block diagram of a navigation system 800 having query mechanism in a third embodiment of the present invention. The navigation system 800 can include a first device 802, a communication path 804, and a second device 806. The first device 802 can be the second device 104 of FIG. 1. The communication path 804 can be the communication path 106 of FIG. 1. The second device 806 can be the first device 102 of FIG. 1.

The first device 802 can send information over the communication path 804 to the second device 806. The second device 806 can send information over the communication path 804 to the first device 802.

For illustrative purposes, the navigation system 800 is shown with the first device 802 as a client, although it is understood that the navigation system 800 can have the first device 802 as a different type of device. For example, the first device 802 can be a server.

Also for illustrative purposes, the navigation system 800 is shown with the second device 806 as a server, although it is understood that the navigation system 800 can have the second device 806 as a different type of device. For example, the second device 806 can be a client.

For brevity of description this embodiment of the present invention, the first device 802 will be described as a client device and the second device 806 will be described as a server device. The present invention is not limited to this selection for the type of devices. The selection is an example of the present invention.

The first device 802 can be any type of device, such as a cellular phone, a personal digital assistant, a notebook computer, or an entertainment device. The first device 802 can be a standalone device, or can be incorporated with a vehicle, for example a car, truck, bus, or train. For example, the display of the first device 802 can be an in-dash display on the vehicle.

The first device 802 can include, for example, a first control unit 808, such as a processor, a first storage unit 810, a first communication unit 814, the guidance module 230 of FIG. 2, a location unit 807, and a first user interface 824. For illustrative purposes, the navigation system 800 is shown with the first device 802 described with discrete functional blocks, although it is understood that the navigation system 800 can have the first device 802 in a different configuration. For example, the first control unit 808, the first communication unit 814, the first user interface 824, the guidance module 230 may not be discrete functional blocks, but may have one or more of the aforementioned blocks combined into one functional block.

The first control unit 808 can execute a first software 820 from the first storage unit 810 and provide the intelligence of the first device 802. As an example, the first software 820 can include a portion of the navigation system 200 of FIG. 2. The first control unit 808 can operate the first user interface 824 to display information generated by the navigation system 800.

The first control unit 808 can also execute the first software 820 for the other functions of the navigation system 800, including receiving location information from the location unit 706 such as the current location 232. The first control unit 808 can operate the guidance module 230 to generate the turn guidance 236 associated with the current location 232 and the route 226.

The first storage unit 810 can be implemented in a number of ways. For example, the first storage unit 810 can be a volatile memory, a nonvolatile memory, an internal memory, an external memory, or a combination thereof.

The first storage unit 810 can include the first software 820 of the first device 802, first query data 812, the map data 210 and the route 226. The first query data 812 can be a portion of the query data 212 of FIG. 2. For example, the first query data 812 can include the edge data 304 of FIG. 3 and the turn identification 306 of FIG. 3 of an intersection included in the map data 210.

The guidance module 230 can read the first query data 812 and can generate the turn guidance 236 associated with the current location 232 on the route 226. The guidance module 230 can also validate the current location 232 of the first device 802 relative to the route 226.

The first storage unit 810 can also include the route 226. The route 226 can be generated by the routing module 220. For illustrative purposes, the navigation system 800 is described with the routing module 220 on the second device 806, although it is understood that the routing module 220 can be on any device with the navigation system 800. For example, the routing module 220 can be included on the first device 802, the second device 806, another device (not shown) or a combination thereof.

The first storage unit 810 can also include the map data 210. The map data 210 can be used by the guidance module 230 to generate the turn guidance 236. The map data 210 can be received from the first user interface 824, or from the second device 806 across the communication path 804.

The first user interface 824 can include an output device and an input device. For example, the output device can include a projector, a video screen, a speaker, or any combination thereof. Examples of the input device are a key pad, a touchpad, soft-keys, a keyboard, a microphone, or any combination thereof to provide data and command inputs.

The location unit 807 of the first device 802 can generate a location reading of the first device 802 such as the current location 232 of FIG. 2. The location unit 807 can be implemented in many ways. For example, the location unit can be a global positioning system (GPS), inertial navigation system, cell-tower location system, accelerometer location system, or a combination thereof.

The first communication unit 814 can include active and passive components, such as microelectronics or an antenna, for interaction with the communication path 804. The first control unit 808 can execute the first software 820 and can provide the intelligence of the first device 802 for interaction with the second device 806, the first user interface 824, the communication path 804 via the first communication unit 814, and interaction to the location unit 807.

The second device 806 can include, for example, a second control unit 858, such as a processor or computer, a second storage unit 860 with a second software 870, a second communication unit 864, the routing module 220, and a second user interface 874. For illustrative purposes, the navigation system 800 is shown with the second device 806 described with discrete functional blocks, although it is understood that the navigation system 800 can have the second device 806 in a different configuration. For example, the second control unit 858, the second communication unit 864, the routing module 220, and the second user interface 874 may not be discrete functional blocks, but may have one or more of the aforementioned blocks combined into one functional block.

The second storage unit 860 can include the second software 870 of the second device 806, the map data 210, and a second query data 852. The second query data 852 can be a portion of the query data 212. The second software 870 can include a portion of the navigation system 200. For illustrative purposes, the second storage unit 860 is shown as a single element, although it is understood that the second storage unit 860 can be a distribution of storage elements.

Also for illustrative purposes, the navigation system 800 is shown with the second storage unit 860 as a single hierarchy storage system, although it is understood that the navigation system 800 can have the second storage unit 860 in a different configuration. For example, the second storage unit 860 can be formed with different storage technologies forming a memory hierarchal system including different levels of caching, main memory, rotating media, or off-line storage.

The second control unit 858 can execute the second software 870 and provide the intelligence of the second device 806 for interaction with the first device 802, the second user interface 874 and the communication path 804 via the second communication unit 864. The first communication unit 814 can couple with the communication path 804 to send information to the second device 806. The second device 806, can receive information from the first device 802 across the communication path 804 in the second communication unit 864.

For example, the first device 802 can receive the starting location 222 of FIG. 2 and the target destination 224 of FIG. 2 via the first user interface 824. The first communication unit 814 can send the starting location 222 and the target destination 224 across the communication path 804 to the second device 806.

The second communication unit 864 of the second device 806 can receive the starting location 222 and the target destination 224. The second control unit 858 can operate the routing module 220 to generate the route 226 from the starting location 222 to the target destination 224. The second communication unit 864 can send the route 226 across the communication path 804 to the first device 802.

The first communication unit 814 can receive the route 226 from the communication path 804, and store it in the first storage unit 810. The first control unit 808 can operate the display preview module 640 of FIG. 6 on a display component of the first user interface 824.

The first control unit 808 can also operate the location unit 706 to read the current location 232 of the first device 802. The first control unit 808 can also operate the guidance module 230 to generate the turn guidance 236 associated with the current location 232 of the first device 802 and the route 226.

For illustrative purposes, the navigation system 800 is shown with the routing module 220 on the second device and the guidance module 230 on the first device. It is understood that the navigation system 800 operate in a different partition. As an example, the first device 802 can have the routing module 220, the guidance module 230 or a combination thereof, to generate and display navigation routing information on the first user interface 824. As a further example, the second device 806 can have the routing module 220, the guidance module 230, or a combination thereof, to generate and display navigation routing information on the second user interface 874.

Figure 9:
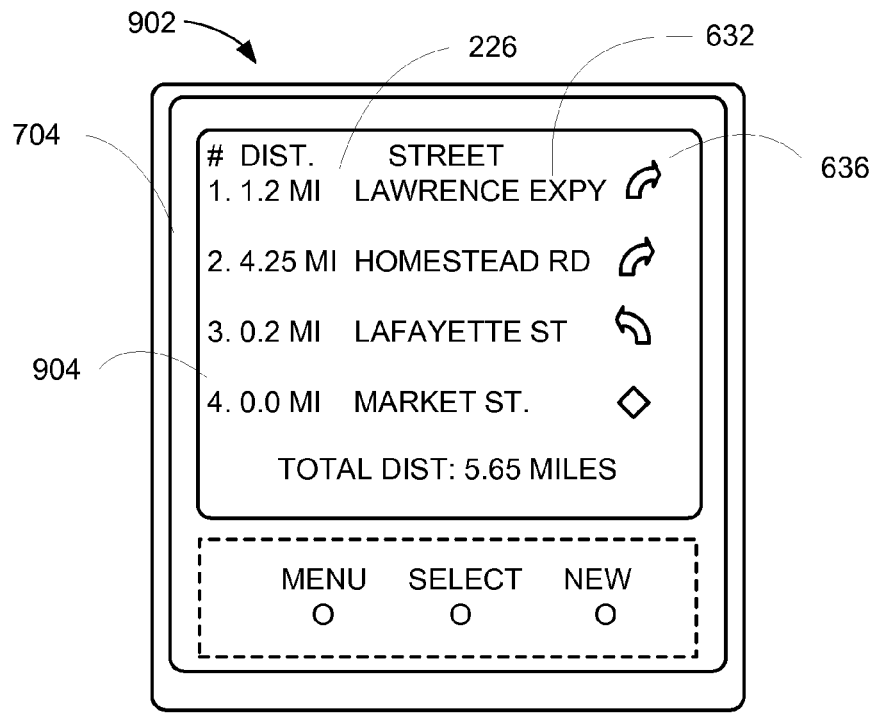
FIG. 9 is an illustration of an example of the navigation system of FIG. 7.

Referring now to FIG. 9, therein is shown an illustration of an example of the navigation system 700 of FIG. 7. A device 902 can represent the navigation system 700, the second device 104 of FIG. 1, the first device 802 of FIG. 8. The device 902 can include the user interface 704 of FIG. 7 with a multimedia display interface 904.

The control unit 708 of FIG. 7 can operate the display preview module 640 of FIG. 6 to present information to the multimedia display interface 904. In this example, the multimedia display interface 904 includes a preview of the route 226 of FIG. 2 selected by the routing module 220 of FIG. 2.

The preview can also show individual streets included in the route 226 as well as the distance and direction along each street included in the route 226. The street names represent the segments 632 of FIG. 6 aggregated from the segments 632 of FIG. 6, and the instructive arrows can graphically represent the turn types 634 of the intersections on the route 226. The preview can provide other information such as the total distance of the route 226 or the expected time duration of the route 226.

Figure 10:
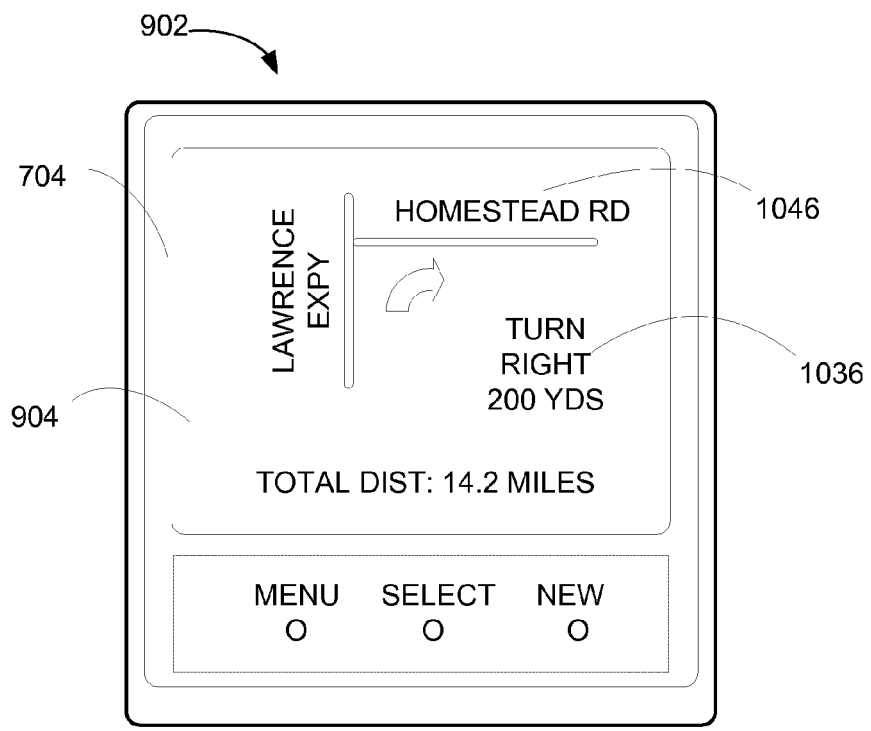
FIG. 10 is an illustration of a further example of the navigation system of FIG. 7.

Referring now to FIG. 10, therein is shown a further example of the navigation system 700 of FIG. 7. The device 902 is shown with the multimedia display interface 904 which can display the turn guidance 236 of FIG. 2 along the route 226 of FIG. 2.

The control unit 708 of FIG. 7 can operate the display guidance module 240 of FIG. 2 to present information to the multimedia display interface 904. In this example, the multimedia display interface 904 can include the turn guidance 236 of FIG. 2 generated by the guidance module 230 of FIG. 2 from the current location 232 of the navigation system 700 to remain on the route 226 of FIG. 2.

The turn instruction represents the turn guidance 236 relative to the current location 232 of the device 902 and the route 226. The turn guidance 236 can be presented as a guidance image 1046 or as guidance text 1036.

If the guidance module 230 detects a deviation from the route 226, the display guidance module 240 can display a warning on the multimedia display interface 904, and the navigation system 700 can operate the routing module 220 to revise the route 226 to navigate to the intended destination.

Figure 11:
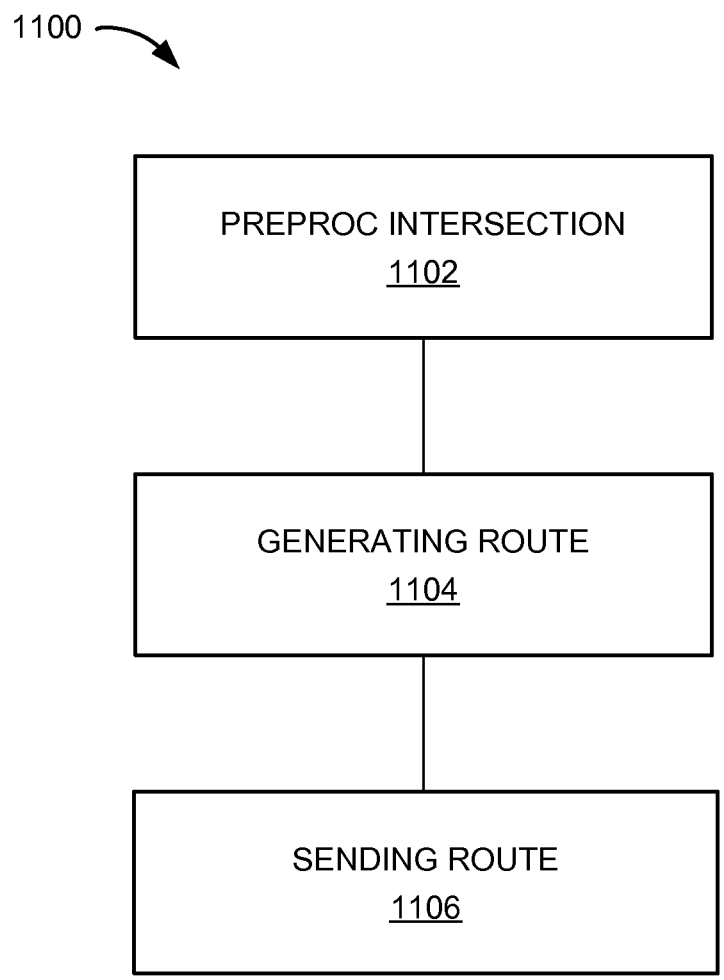
FIG. 11 is a flow chart of a method of operation of the navigation system in a further embodiment of the present invention.

Referring now to FIG. 11, therein is shown a flow chart of a method 1100 of operation of the navigation system 200 in a further embodiment of the present invention. The method 1100 includes preprocessing an intersection from map data into an edge in a block 1102; generating a route having a turn at the intersection in a block 1104; and sending the route for displaying at a device and for maneuvering the turn at the intersection by querying the query data for the edge of the intersection in a block 1106.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
generating a validity flag for validating a starting location and a target destination;
preprocessing an intersection from map data into an edge in query data;
updating revised data in the query data;
generating a route having a turn at the intersection with a control unit based on the validity flag representing valid;
generating a warning representing the route cannot be generated based on if the validity flag represents invalid; and
sending the route for displaying at a device and for maneuvering the turn at the intersection by querying the query data for the edge of the intersection.

2. The method as claimed in claim 1 further comprising removing the intersection not involving the turn along the route.

3. The method as claimed in claim 1 further comprising updating the query data without preprocessing the map data.

4. The method as claimed in claim 1 wherein preprocessing the intersection into the edge in the query data includes generating pre-processed data having edge data and a turn identification for the intersection with the edge data having the edge.

5. The method as claimed in claim 1 wherein sending the route for displaying at the device includes sending a turn guidance for displaying the turn in the route at the device.

6. A method of operation of a navigation system comprising:
generating a validity flag for validating a starting location and a target destination;
preprocessing an intersection from map data into an edge in query data;
updating revised data in the query data;
generating a route having a turn at the intersection with a control unit based on the validity flag representing valid;
generating a warning representing the route cannot be generated based on if the validity flag represents invalid;
removing the intersection not involving the turn along the route from the query data;
updating the query data without preprocessing the map data; and
sending the route for displaying at a device and for maneuvering the turn at the intersection by querying the query data for the edge of the intersection.

7. The method as claimed in claim 6 wherein generating the route includes generating a turn guidance from the query data.

8. The method as claimed in claim 6 further comprising:
receiving a current location for checking the device is off the route; and
updating the route based on the current location off the route and based on the query data.

9. The method as claimed in claim 6 wherein generating the route having the turn at the intersection includes generating a turn type at the intersection.

10. The method as claimed in claim 6 wherein:
preprocessing the intersection into the edge in the query data includes storing the query data having the edge; and
generating the route includes retrieving the edge from the query data.

11. A navigation system comprising:
a control unit for:
generating a validity flag for validating a starting location and a target destination,
preprocessing an intersection from map data into an edge in query data and for updating revised data in the query data,
generating a route having a turn at the intersection based on the validity flag representing valid,
generating a warning representing the route cannot be generated based if the validity flag represents invalid, and
a communication unit, coupled to the control unit, for sending the route for displaying at a device and for maneuvering the turn at the intersection by querying the query data for the edge of the intersection.

12. The system as claimed in claim 11 wherein the control unit is for removing the intersection not involving the turn along the route.

13. The system as claimed in claim 11 wherein the control unit is for updating the query data without preprocessing the map data.

14. The system as claimed in claim 11 wherein the control unit is for generating edge data and a turn identification for the intersection with the edge data having the edge.

15. The system as claimed in claim 11 wherein the communication unit is for sending a turn guidance for displaying the turn in the route at the device.

16. The system as claimed in claim 11 wherein the control unit is for:
   removing the intersection not involving the turn along the route; and
   updating the query data without preprocessing the map data.

17. The system as claimed in claim 16 wherein the control unit is for generating a turn guidance from the query data.

18. The system as claimed in claim 16 further comprising:
   a location unit, coupled to the communication unit, for receiving a current location; wherein the control unit is for:
      checking the current location of the device is off the route; and
      updating the route based on the current location off the route and based on the query data.

19. The system as claimed in claim 16 wherein the control unit is for generating a turn type at the intersection.

20. The system as claimed in claim 16 further comprising a storage unit, coupled to the control unit, for storing the query data having the edge and for retrieving the edge from the query data.

* * * * *